Dec. 27, 1960 A. E. MOULTON 2,966,366
VEHICLE SUSPENSION SYSTEM HAVING DIFFERENTIAL
INTERACTION BETWEEN FRONT AND REAR WHEELS
Filed Oct. 31, 1955 5 Sheets-Sheet 1

INVENTOR
ALEXANDER ERIC MOULTON
BY
ATTORNEYS

Dec. 27, 1960   A. E. MOULTON   2,966,366
VEHICLE SUSPENSION SYSTEM HAVING DIFFERENTIAL
INTERACTION BETWEEN FRONT AND REAR WHEELS
Filed Oct. 31, 1955   5 Sheets-Sheet 3

INVENTOR
ALEXANDER ERIC MOULTON

BY Shoemaker & Mattare

ATTORNEYS

United States Patent Office 2,966,366
Patented Dec. 27, 1960

2,966,366

VEHICLE SUSPENSION SYSTEM HAVING DIFFERENTIAL INTERACTION BETWEEN FRONT AND REAR WHEELS

Alexander Eric Moulton, Bradford-on-Avon, England, assignor to Moulton Developments Limited, Bradford-on-Avon, England, a British company Filed Oct. 31, 1955, Ser. No. 544,001

9 Claims. (Cl. 280—104)

This invention relates to vehicle suspensions and has more especial reference to spring suspension for motor vehicles of the kind in which provision is made for differential interaction between the front and rear wheel springing.

One object of the invention is to provide vehicle suspensions in which there is transverse independence of at least either the front springing or the rear springing and in which provision is made for differential interaction between the suspensions of the front and rear wheels at the respective sides of the vehicle.

The advantages of interconnecting a suspension between the front and rear of the vehicle are well known, and have been manifested in many forms over the years. The principal advantage is a reduction in the pitch frequency in relation to the bounce frequency which transforms the character of the ride. The disadvantage of a full degree of interconnection is that the vehicle tends to be somewhat unstable in pitch, altering the pitch attitude under braking conditions and under inequalities of loading.

Another object of the invention is to provide apparatus which will give a moderate degree of interconnection. From experience of a rig when arranged to simulate the inertia of a vehicle of $k^2/ab$ ratio of unity, with a bounce frequency of 85 c.p.m., and correspondingly a pitch frequency of 85 c.p.m. without interconnection, it is found that with the interconnection including a rubber spring operated hydraulic accumulator the pitch frequency is reduced to 65 c.p.m., moreover the apparatus is essentially simple there being no points of leakage requiring glands or restoration by means of continuously working pumps.

An additional object of the invention is that by the use of a simple hand pump, the trim of the vehicle may be restored by pumping in additional fluid with a greater loading of the vehicle which maintains a constant frequency level, regardless of load, and in addition the frequency levels can be increased at will be riding the vehicle somewhat high or low on the S-shaped load/deflection curve.

Additionally, it has been found that there is an inherent hydraulic viscous damping in the system, due to the flow of the fluid to and fro in the interconnecting pipeline, and due to the extension and contraction of the interconnecting pipe or bounce spring, which reduces the burden on conventional dampers if fitted, or eliminates the necessity for them.

The invention will be further described with reference to the accompanying drawings which illustrate several embodiments diagrammatically and in which:

Figure 1 shows an arrangement wherein the fore and aft suspensions are interconnected by a system of inextensible pipes including a rubber spring-operated accumulator as aforementioned, while

Figure 1:
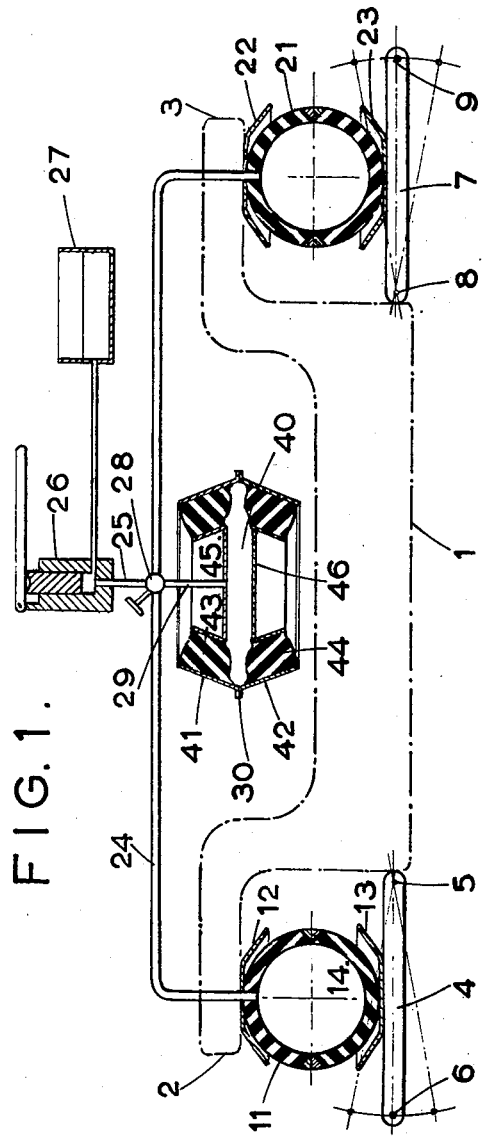

Referring now to the drawings, it will be appreciated that in all embodiments like reference characters indicate like or equivalent parts, and 1 generally designates the main frame or sprung structure of a vehicle, 2 a front spring abutment on such structure, and 3 the corresponding rear spring abutment.

4 represents a front link or wishbone pivoted to such structure at 5 and having a road wheel (not shown) associated with its free end 6, while 7 is a corresponding rear link or wishbone pivoted to the structure at 8 and having a free end 9 with which is associated a road wheel (not shown).

Referring now first more particularly to Figure 1, the front spring diagrammatically illustrated comprises a resilient hollow sphere 11 consisting of two hemispheres, suitably of rubber, joined on a horizontal plane in a fluid-tight manner.

The front sphere 11 is shown interposed between upper and lower dished metal plates 12 and 13, the former being secured to the front abutment 2 of the sprung structure, and the latter resting on the wishbone 4. The hollow sphere 11 contains an hydraulic medium 14 and it will be appreciated that if oil is employed the sphere 11 will require to be made of, or lined with, oil resisting material, suitable synthetic rubbers being available.

In Figure 1 the rear suspension diagrammatically illustrated similarly comprises a hollow resilient sphere 21 between upper and lower dished plates 22 and 23, and it will be appreciated that deflections of the wishbones 4 or 7 when cushioning road shocks deform the spheres 11 or 21 as the case may be.

24 represents a pipeline, suitably of metal, interconnecting the fore and aft spheres 11 and 21, while 25 is a branch line in which is a pump 26 by which the system may be charged with hydraulic medium from a reservoir 27, and 28 represents a valve which normally closes the branch line 25 and opens the interconnecting pipeline 24 through a conduit 29 to a rubber spring-operated hydraulic accumulator generally designated 30 and suitably of the form described in the specification of my Patent Number 2,883,180.

Such accumulator has a central chamber 40 formed between two hollow frusto conical rings 41 and 42 which have mating flanges bolted or clamped together in a fluid-tight manner.

Moulded on to each ring is a hollow frusto conical ring of rubber 43 for the ring 41 and 44 for the ring 42, and concentrically within each rubber body is a metal ferrule to which the rubber is bonded, the upper ferrule being designated 45 and the lower ferrule 46, such ferrules forming the upper and lower central walls of the chamber 40 and the conduit 29 opening into such chamber through a port in the upper ferrule 45.

The valve 28 may be arranged for operation by the driver to allow in one position open connection through it between the hollow fore and aft spheres 11 and 21, while isolating the conduits 25 and 29, and in another position it may be set to close the connection between the fore and aft springs through the pipeline 24.

Figure 2:
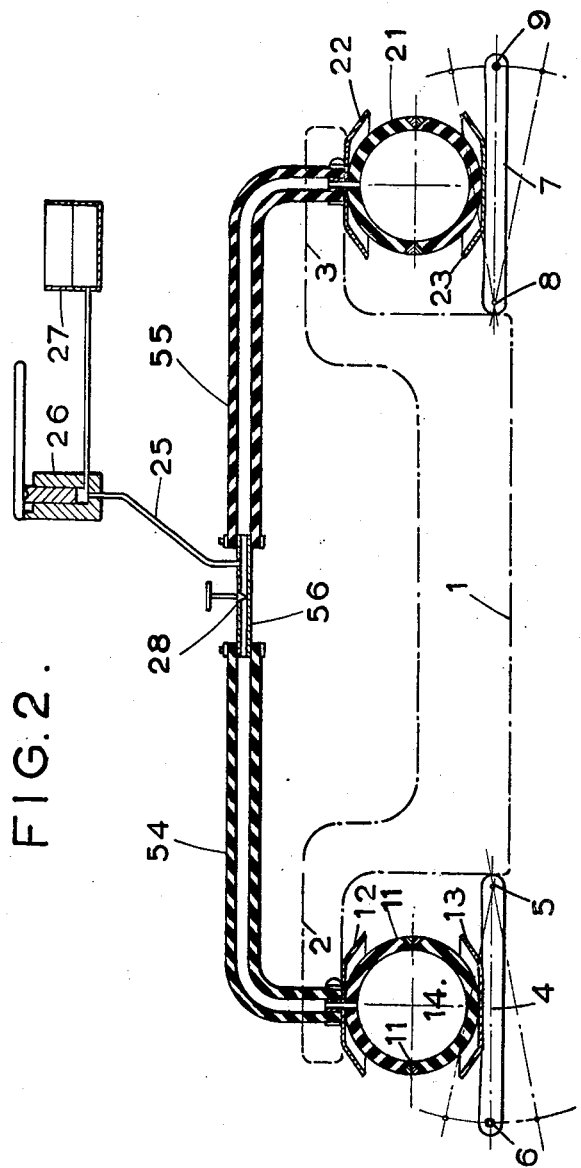
Figure 2 is a similar arrangement in which the piping consists of a resilient material, such as rubber, serving as an hydraulic accumulator.

In Figure 2, instead of the metallic pipeline interconnecting the front and rear suspensions and opening connection with the hydraulic accumulator 30 which was provided in the first embodiment, there is shown resilient piping comprising a front section 54 for the front sphere 11 and a rear section 55 for the rear suspension sphere 21 and in this case displacement of the hydraulic medium 14 from the front sphere 11 when the front wishbone 4 moves upwardly as when its wheel encounters a road obstruction tend to produce distension of the resilient pipeline 54 particularly when the valve 28 is closed.

A similar action occurs in the rear section of the resilient piping 55 when the rear sphere 21 is deformed, and the degree of interaction between the fore and aft systems may be varied by adjusting the valve 28.

For the purposes of illustration the valve 28 is shown in Figure 2 mounted in a metal junction pipe 56 bridging the resilient sections 54 and 55.

Figure 3:
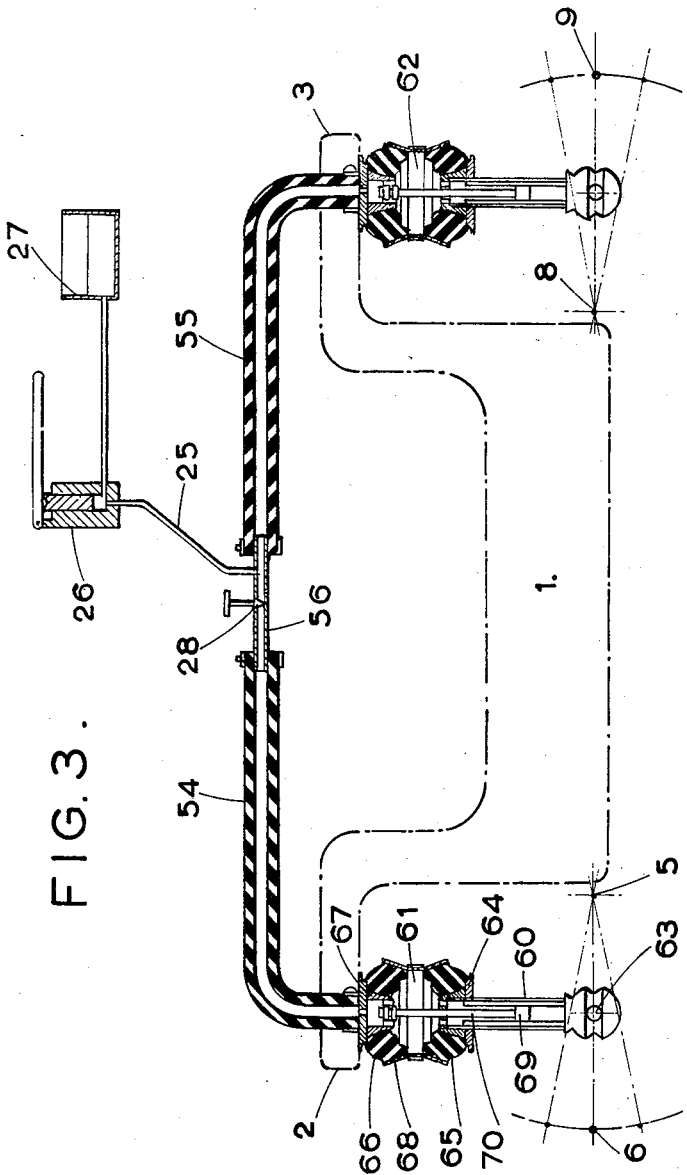
Figure 3 shows a further arrangement also employing a resilient pipe interconnecting the fore and aft suspension systems, each consisting of a combined telescopic hydraulic damper and rubber spring, Figure 4 showing a still further arrangement in which separate hydraulic fluid is employed in the damper.

Referring now to the arrangement diagrammatically illustrated in Figure 3 where resilient pipe sections 54 and 55 are provided in the pipeline interconnecting the fore and aft wheel suspensions as in the arrangement already described with reference to Figure 2, the hollow spherical springs of that embodiment are replaced in Figure 3 by rubber spring operated accumulators generally designated 61 for the front spring and 62 for the rear spring, in each case combined with a telescopic hydraulic damper arranged to act additionally as a stabilizing guide for the spring.

60 represents the outer cylinder of the front damper pivotally mounted at its lower end 63 to the front wishbone and having welded near its upper end a disc 64 carrying the lower frusto conical rubber element 65 of the spring operated accumulator, the upper rubber element 66 of which is bonded to a metal ferrule 67 in turn supporting the front abutment 2 of the sprung structure of the vehicle.

The two frusto conical rings 65 and 66 are bonded within a central metal sleeve 68 forming a spring chamber for the hydraulic medium which in this case is common to both fore and aft hydraulic dampers and to the interconnecting system, thereby avoiding the necessity for intervening glands or seals.

69 represents a piston of the front hydraulic damper being mounted at the lower end of a rod 70 depending within the cylinder 60 from the upper ferrule 67 of the spring, the fore and aft suspensions being shown composed of identical components and being arranged so that upward wheel deflections are resisted by the combined action of the frusto conical rubber rings, 65 and 66 which are deformed in shear and compression within the sleeve 68 and the hydraulic fluid in the system which is displaced on such deformation.

Figure 4:
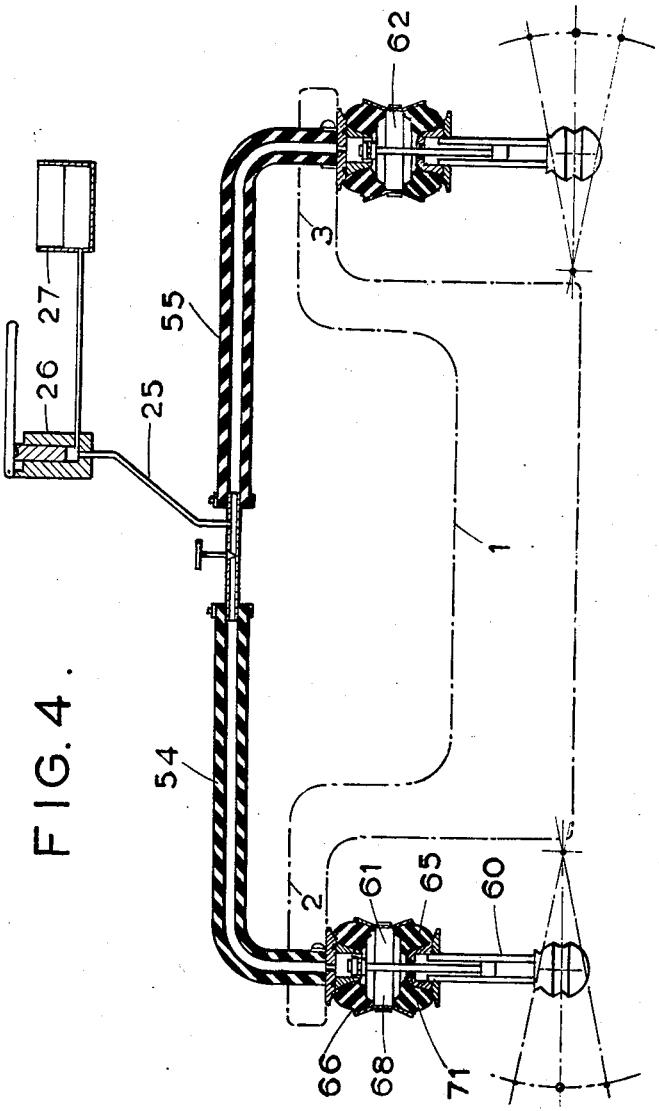
Figure 5:
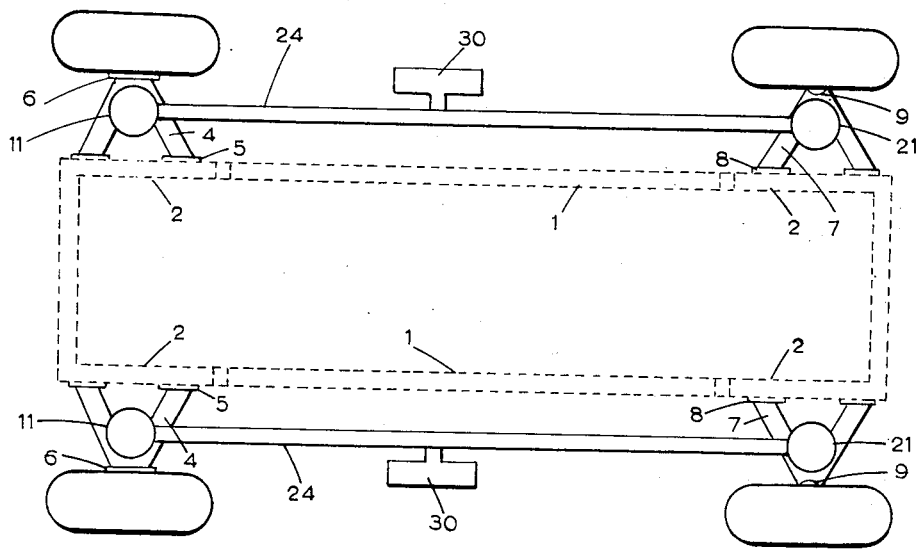

The arrangement illustrated in Figure 4 also employs for both the fore and aft suspension rubber springs combined with telescopic hydraulic dampers but with the hydraulic medium in the two spring accumulators 61 and 62 and the interconnecting pipeline 54, 55 and 56 separated from that employed in the telescopic dampers, the upper ends of the front and rear damper cylinders 60 being furnished with sealing means 71 which isolate the damper fluid from that employed to interconnect the two suspension systems.

What I claim is:

1. In a suspension system for a vehicle having a main frame and front and rear wheels, a hollow fluid filled deformable unit associated with each wheel and forming a spring connection between the wheel and the frame, each unit embodying; a pair of superposed annular rubber members joined together by an annular metal ferrule, a damper embodying an upright fluid cylinder secured at its top end in the center of the lower annular rubber member and pivotally coupled at its lower end to the adjacent wheel, a piston rod attached at one end to the central part of the upper annular rubber member and depending into the cylinder and a piston on the rod and fitting in the cylinder; and a fluid filled conduit connection between each front wheel unit and the rear wheel unit at its side of the vehicle only, the conduit at its ends communicating with the interiors of the respective units through the centers of the upper annular rubber members thereof and the conduit connected front and rear wheel units on one side of the vehicle being independent of those on the other side of the vehicle.

2. A suspension system according to claim 1, wherein the conduit between a front wheel unit and the adjacent rear wheel unit is for the major part thereof formed of elastic material adapted to expand under internal pressure.

3. A suspension system according to claim 1 with sealing means in the upper end of each cylinder around the piston rod and isolating the damper fluid from the fluid filling the units and conduit.

4. A suspension system for a four-wheeled vehicle having a main frame, front and rear wheels, a single liquid-filled hermetically-sealed resiliently deformable displaced unit associated with each wheel and forming a spring connection between the wheel and the frame, a single conduit means forming a liquid connection between each front wheel displacer unit and the rear wheel unit at its side of the vehicle only, the conduit connected front and rear wheel units on one side of the vehicle being independent of those on the other side of the vehicle; said conduit means including a chamber of variable volume filled with liquid, at least a portion of the wall of the chamber being formed of elastic rubber-like material, and in which increase in hydraulic pressure resulting from deflection of the interconnected displacer units produces resilient deformation of the elastic wall.

5. A suspension system according to claim 4 wherein said conduit connections are formed at least in part of elastic material adapted to expand under internal pressure.

6. A suspension system for four wheeled automotive vehicles having transversely independent suspension means, comprising a pair of separate hermetically-sealed and liquid-filled hydraulic conduit systems interconnecting longitudinally the front and rear wheel-suspension means at the respective sides of the vehicle and each including a pair of hydraulic displacer units associated individually with the respective interconnected wheel-suspension means, the suspension systems at the respective sides of the vehicle each including one or more springs each comprising a liquid-filled rubber hydraulic accumulator having an elastic wall, in which increase in hydraulic pressure resulting from deflection of the respective wheel suspensions produces resilient deformation of the elastic wall, thereby providing springing in bounce and roll, and wherein each hydraulic accumulator comprises two sections formed of elastic material adapted to expand under internal pressure, and a valved coupler between the two sections.

7. A suspension system for four wheeled automotive vehicles having transversely independent suspension means, comprising a pair of separate hermetically-sealed and liquid-filled hydraulic conduit systems interconnecting longitudinally the front and rear wheel-suspension means at the respective sides of the vehicle and each including a pair of hydraulic displacer units associated individually with the respective interconnected wheel-suspension means, wherein the conduit connection between each front unit and the adjacent rear unit embodies two sections formed of elastic material adapted to expand under internal pressure, and a valved coupler between the two sections.

8. A suspension system for four wheeled automotive vehicles having transversely independent suspension means comprising a pair of separate hermetically-sealed and liquid-filled hydraulic systems interconnecting longitudinally the front and rear wheel-suspension means at the respective sides of the vehicle and each including a pair of hydraulic displacer units associated individually with the respective interconnected wheel-suspension means, the suspension systems at the respective sides of the vehicle each including one or more springs each comprising a liquid-filled rubber hydraulic accumulator having an elastic wall, in which increase in hydraulic pressure resulting from deflection of the respective wheel suspensions produces resilient deformation of the elastic wall, thereby providing springing in bounce and roll, and wherein the hydraulic displacer units, associated individually with the respective interconnected wheel-suspension means, are at least in part formed of resilient material and have essentially a spring rate, thereby providing springing for the vehicle in pitch.

9. A suspension system for a four wheeled automotive vehicle having transversely independent wheel suspension means, comprising a pair of separate hermetically-sealed and liquid-filled hydraulic systems interconnecting longitudinally the front and rear wheel-suspension means at the respective sides of the vehicle and each including a pair of hydraulic displacer units associated individually with the respective interconnected wheel-suspension means, said pair of displacer units being interconnected by means of a fluid filled conduit, the suspension systems at the respective sides of the vehicle each including one or more springs each comprising at least one annular body of rubber having bonded to its inner peripheral surface a cup like metal member, a metal shell being bonded to the outer peripheral surface of said rubber body and encasing said body to form a fluid-filled receiving chamber in communication with said fluid-filled conduit, increase in fluid pressure in said chamber resulting in resilient deformation of said rubber body, thereby providing springing in bounce and roll, and wherein the hydraulic displacer units, associated individually with the respective interconnected wheel suspension means, are at least in part formed of resilient material and have essentially a spring rate, thereby providing springing for the vehicle in pitch.

References Cited in the file of this patent

UNITED STATES PATENTS

| | | |
|---|---|---|
| 1,066,710 | Cooper | July 8, 1913 |
| 1,865,865 | Lafleur | July 5, 1932 |
| 2,139,178 | Stevens | Dec. 6, 1938 |
| 2,261,948 | Beach | Nov. 11, 1941 |
| 2,442,601 | House | June 1, 1948 |
| 2,443,433 | Sanmori | June 15, 1948 |
| 2,504,424 | Kraak | Apr. 18, 1950 |
| 2,694,569 | Gouirand | Nov. 16, 1954 |
| 2,707,110 | Stover | Apr. 26, 1955 |
| 2,842,358 | Nardi | July 8, 1958 |

FOREIGN PATENTS

| | | |
|---|---|---|
| 601,731 | Great Britain | May 12, 1948 |